United States Patent
Bisht et al.

(10) Patent No.: US 8,747,622 B2
(45) Date of Patent: Jun. 10, 2014

(54) AROMATICS-RECOVERY PROCESS

(75) Inventors: Deepak Bisht, Delhi (IN); Anup Dhaigude, Mumbai (IN); Sandeep Gupta, Ghaziabad (IN)

(73) Assignee: UOP LLC, Des Plaines, IL (US)

( * ) Notice: Subject to any disclaimer, the term of this patent is extended or adjusted under 35 U.S.C. 154(b) by 366 days.

(21) Appl. No.: 13/170,726

(22) Filed: Jun. 28, 2011

(65) Prior Publication Data

US 2013/0001811 A1 Jan. 3, 2013

(51) Int. Cl.
*B01D 3/00* (2006.01)

(52) U.S. Cl.
USPC ........... 203/91; 202/185.2; 202/202; 202/205

(58) Field of Classification Search
USPC ................. 203/91; 202/182, 185.2, 202, 205; 208/366
See application file for complete search history.

(56) References Cited

U.S. PATENT DOCUMENTS

| | | | |
|---|---|---|---|
| 3,466,745 A | 9/1969 | Stopp | |
| 3,590,092 A | 6/1971 | Uitti | |
| 4,048,062 A | 9/1977 | Asselin | |
| 4,175,034 A | 11/1979 | Thompson | |
| 4,664,786 A | 5/1987 | Forte | |
| 6,017,195 A | 1/2000 | Skaggs | |
| 6,346,173 B2 * | 2/2002 | Popov et al. | 203/91 |
| 7,169,368 B1 | 1/2007 | Sullivan | |
| 7,328,591 B2 | 2/2008 | Holtzapple | |

OTHER PUBLICATIONS

Sharma, et al., Hydrodynamic Studies of Two Cocurrent Flow Immiscible Liquids Through an Ejector, Chemical Engineering World, vol. 13 No. 10, Oct. 1978, pp. 47-51.

* cited by examiner

*Primary Examiner* — Robert A Hopkins
(74) *Attorney, Agent, or Firm* — Mark R Willis

(57) ABSTRACT

The present invention comprises a process for recovery of sulfolane used in a solvent-extraction or extractive-distillation process. A recovery column for the sulfolane solvent comprises a liquid-jet ejector for maintaining the needed vacuum conditions, preferably using water as the liquid.

4 Claims, 2 Drawing Sheets

AROMATICS-RECOVERY PROCESS

FIELD OF THE INVENTION

The present invention relates to the recovery of aromatic hydrocarbons from a stream containing a mixture of aromatic and aliphatic hydrocarbons. More specifically, the invention relates to an improvement in recovery of aromatics from solvent in an extraction or extractive-distillation process in a closed solvent loop.

BACKGROUND OF THE INVENTION

The present invention is adaptable for use in the separation and ultimate recovery of polar hydrocarbons from non-polar hydrocarbons, which separation is effected through the use of a polar solvent characteristically selective for absorbing polar hydrocarbons. Polar hydrocarbons are selectively absorbed relative to non-polar hydrocarbons by a polar solvent via electrostatic forces, for example naphthenes are selectively absorbed relative to paraffins or aromatics are selectively absorbed relative to naphthenes or paraffins. More specifically, the invention is directed toward the regeneration and recovery of the solvent utilized to extract aromatic hydrocarbons from various mixtures thereof with non-aromatic hydrocarbons. In this application, the separation process serves to segregate particular aromatic hydrocarbons such as benzene, toluene and/or $C_8$-aromatics from other hydrocarbons normally contained in the same boiling range of petroleum fractions and process.

OBJECTS AND EMBODIMENTS

A principal object of the invention is to enhance and facilitate recovery of a substantially hydrocarbon-free solvent utilized to separate a mixture thereof with non-polar and polar hydrocarbons. A corollary objective is a method for separating recovered polar hydrocarbons from a solvent selective for absorbing the polar hydrocarbons. A more specific object of the invention is to effect reduction in the cost of utilities and capital investment in a process for separating aromatic hydrocarbons from a mixture thereof with a selective solvent while regenerating and recovering the solvent and maintaining extraction efficiency as well as minimizing the fugitive emission of hydrocarbons to the environment.

In a broad embodiment, the invention comprises a method for recovering a substantially hydrocarbon-free, polar-hydrocarbon-selective solvent from a mixture of the selective solvent and polar hydrocarbons, which method comprises the steps of introducing the mixture into a solvent-recovery column having a heat source connected to a bottom portion of the column and removing a lean solvent stream, substantially free of hydrocarbons, from the bottom of the column, removing a polar-hydrocarbon-rich overhead stream from the top section of the column and condensing the overhead stream into a receiver operating at a sub-atmospheric pressure of from about 1 to 100 kPa, and maintaining the sub-atmospheric pressure by connection of the receiver to a liquid-jet ejector.

A more specific embodiment is a method for recovering a substantially hydrocarbon-free, polar-hydrocarbon-selective solvent from a mixture of the selective solvent and polar hydrocarbons, which method comprises the steps of introducing the mixture into a solvent-recovery column having a heat source connected to a bottom portion of the column and removing a lean solvent stream, substantially free of hydrocarbons, from the bottom of the column, removing a polar-hydrocarbon-rich overhead stream from the top section of the column and condensing the overhead stream into a receiver operating at a sub-atmospheric pressure of from about 1 to 100 kPa, and maintaining the sub-atmospheric pressure by connection of the receiver to a liquid-jet ejector, ejecting ejector fluid to a receptacle and recycling fluid from the receptacle to the liquid-jet ejector.

A yet more specific embodiment is a method for recovering a substantially hydrocarbon-free sulfolane solvent from a mixture comprising sulfolane and aromatic hydrocarbons, which method comprises the steps of introducing the mixture into a solvent-recovery column having a heat source connected to a bottom portion of the column and removing a sulfolane stream, substantially free of hydrocarbons, from the bottom of the column, removing an aromatics-rich overhead stream from the top section of the column and condensing the overhead stream into a receiver operating at a sub-atmospheric pressure of from about 1 to 100 kPa, and maintaining the sub-atmospheric pressure by connection of the receiver to a liquid-jet ejector, ejecting ejector fluid to a receptacle, decanting hydrocarbon-containing fluids to recovery and recycling ejector fluid from the receptacle to the liquid-jet ejector.

An alternative embodiment is an apparatus for controlling the pressure in the overhead receiver of a distillation column comprising a receiver-vapor conduit in fluid communication with the receiver and with a vapor inlet of a liquid-jet ejector, a fluid-recycle conduit in fluid communication with a liquid-jet inlet of the ejector, a receptacle in fluid communication with the outlet of the ejector, an outlet conduit in fluid communication with the receptacle and an ejector pump, and the fluid-recycle conduit in fluid communication with the ejector pump and the ejector.

DESCRIPTION OF EMBODIMENTS OF THE INVENTION

Figure 1:
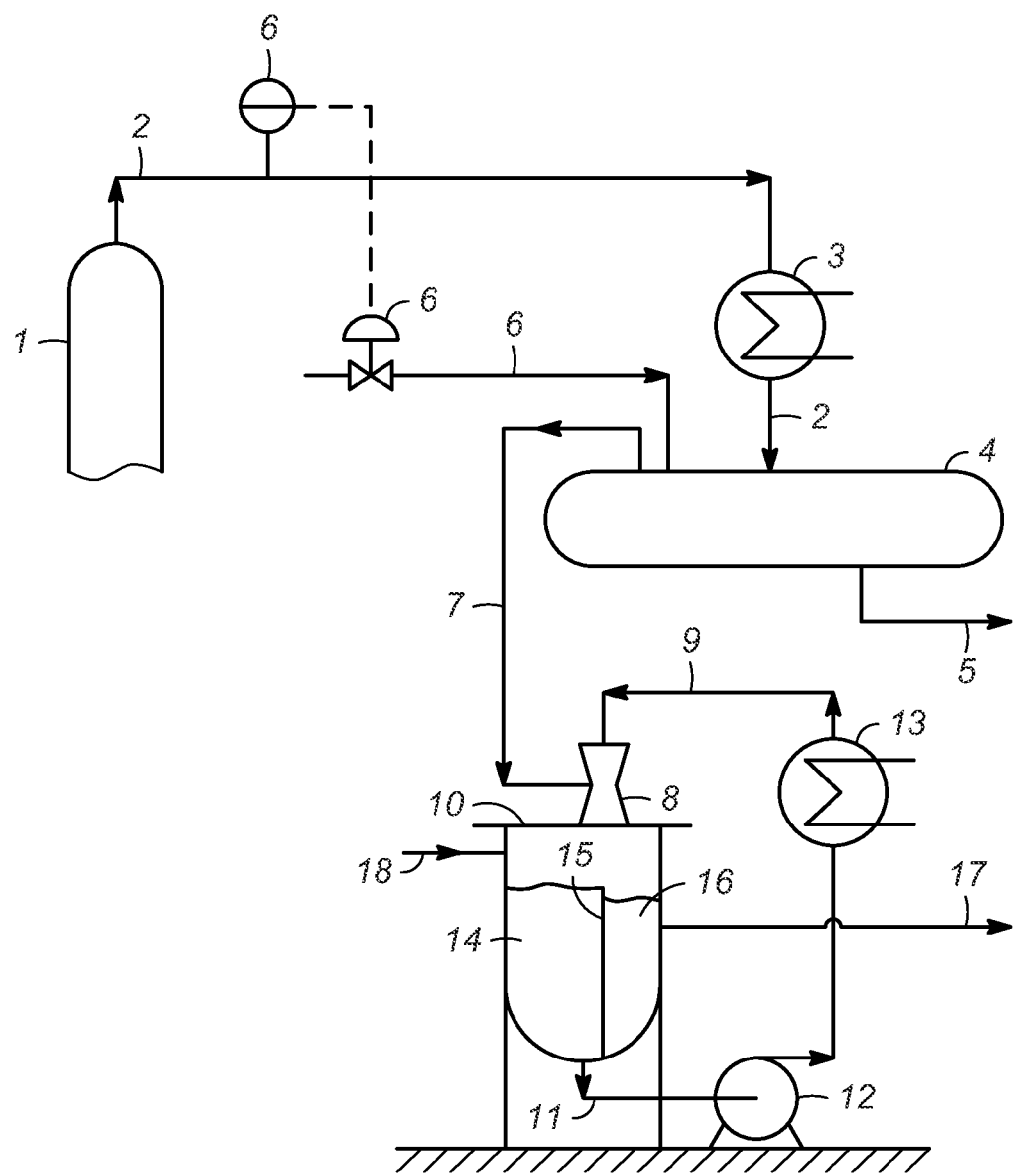
FIG. 1 illustrates the placement of a liquid-jet ejector of the invention.

The present invention is adaptable for recovery of a polar solvent employed in the separation and recovery of polar hydrocarbons from non-polar hydrocarbons. The invention is particularly suitable in a process for the recovery of aromatic hydrocarbons from a hydrocarbon mixture using an aromatics-selective solvent. Any hydrocarbon mixture having a sufficiently high aromatic concentration to justify the recovery thereof is suitable, particularly those having an aromatics content, without being limited thereby, from about 15% to about 75% by volume. The mixtures generally include, in addition to $C_6$, $C_7$ and $C_8$-aromatics, non-aromatics predominating in $C_7$, $C_8$ and $C_9$ paraffins and naphthenes. Examples of sources of suitable charge stocks are the stabilized (usually debutanized or depentanized) product from a catalytic reforming unit, wash oil, coke-oven by-product and hydrotreated pyrolysis naphtha. Liquid-liquid extraction and extractive distillation comprise applicable processes, the choice of which depends on the boiling range and aromatics concentration of the feedstock.

Aromatic hydrocarbons are effectively recovered from mixtures containing aromatic and non-aromatic hydrocarbons by liquid-liquid extraction. This process is particularly suitable for wider-range feedstocks such as mixtures comprising benzene, toluene and xylenes. Descriptions of liquid-liquid extraction are found in, e.g., U.S. Pat. No. 3,466,745 and U.S. Pat. No. 4,048,062, incorporated herein by reference. The process utilizes a solvent which may be indefinitely recycled within the system, yields the desired product in high purity and separates the recycled solvent selectively from the products of the process. A primary example is a separation process wherein a mixture of various classes of hydrocarbons is introduced into an extraction zone and is countercurrently contacted therein with a solvent selective for absorbing aromatic hydrocarbons. A raffinate phase, comprising substantially all of the non-aromatic hydrocarbons in the feedstock after absorption of aromatic compounds, is one product of the extraction zone. A rich solvent, comprising the extracted aromatic compounds contained in the selective solvent, is another stream removed from the extraction zone for recovery of the aromatic hydrocarbons in a solvent-recovery column. An aromatic-hydrocarbon product is recovered by stripping the rich-solvent phase to remove residual non-aromatic hydrocarbons and fractionating the residual portion at sub-atmospheric pressure to yield the aromatic hydrocarbons and recycle lean solvent to the extraction zone.

Extractive distillation is an alternative aromatics-recovery process which typically is applied to lighter hydrocarbon fractions and comprises an extractive-distillation column and a solvent-recovery column. Perspective on extractive distillation can be gained via U.S. Pat. No. 3,590,092 and U.S. Pat. No. 7,169,368, incorporated herein by reference. A nonvolatile solvent passes to an upper section and the hydrocarbon fraction is introduced to a middle section of the extractive-distillation column. As the solvent descends through the column, it preferentially extracts the polar components (aromatics) to form a rich solvent while the non-polar component vapor comprising non-polar components ascends to the top of the column. Overhead vapor is condensed, with a portion of the condensate being recycled to the top section of the extractive-distillation column as reflux while a net portion is withdrawn as a raffinate product. Rich solvent from the bottom of the extractive-distillation column, comprising the solvent and the polar components, is fed into a solvent-recovery column to recover aromatic hydrocarbons as an overhead product. Bottoms from the solvent-recovery column comprise lean solvent, free of hydrocarbons, which is recycled to the upper portion of the extractive-distillation column as the extractive solvent.

Broadly, the present inventive concept involves introducing a rich solvent comprising a mixture of polar hydrocarbons and a selective solvent into a solvent-recovery column, operating at subatmospheric pressure effected by a liquid-jet ejector, to separate polar hydrocarbons from the selective solvent. In a preferred embodiment, the polar hydrocarbons comprise aromatic hydrocarbons recovered from a mixed hydrocarbon stream according to the liquid-liquid extraction or extractive-distillation process described above.

The preferred solvent-recovery column 1 (top section shown in FIG. 1), is in fluid communication with an overhead conduit 2 which in turn is in fluid communication with a condenser 3 and thence with receiver 4. The condenser may be one or more of an air-cooled exchanger, a water-cooled exchanger, or an exchanger transferring heat to another process stream. Pressure controller 6 and associated conduit provide control through nitrogen injection of the pressure in the receiver. The receiver 4 is in fluid communication with a receiver-vapor conduit 7 which in turn is in fluid communication with a vapor inlet of liquid-jet ejector 8. A liquid-jet inlet of ejector 8 also is in fluid communication with fluid-supply conduit 9 which supplies the fluid which maintains a subatmospheric pressure in the receiver 4. The fluid supplied to the ejector preferably comprises water, and may comprise process solvent such as sulfolane and/or hydrocarbons such as those contained in the mixture sent to the solvent-recovery column. The liquid-jet ejector draws residual uncondensed vapors from the receiver, and an embodiment is described in more detail in FIG. 2.

An outlet of the ejector usually in fluid communication with a receptacle 10 which receives ejector fluid 14 from the jet ejector. The receptacle comprises a baffle 15 which enables decanting of lighter fluids which may contain hydrocarbons and are sent via conduit 17 which is in fluid communication with vessel 10 for recovery in other areas of the process or offsite. The receptacle may be of any configuration suitable for the process as claimed and usually is located essentially at ground level. The receptacle generally is in fluid communication with outlet conduit 11 which is in fluid communication with ejector pump 12 which returns ejector fluid to the jet ejector via recycle conduit 9. Ejector fluid also may be cooled in exchanger 13 before being returned to the jet ejector. The loss of ejector fluid via conduit 17 may be made up by, e.g., condensate supplied via conduit 18.

The sub-atmospheric receiver pressure generally is in the range of from about 1 to 100 kPa, and more usually about 10 to 90 kPa. The solvent-recovery column 1 also comprises a reboiler, which comprises a heat source which may be steam, hot oil, or via exchange with another process stream. The sub-atmospheric pressure in the receiver enables a temperature at the bottom of the fractionator which is below that which would result in substantial decomposition of the selective solvent recovered as lean solvent 17.

Figure 2:
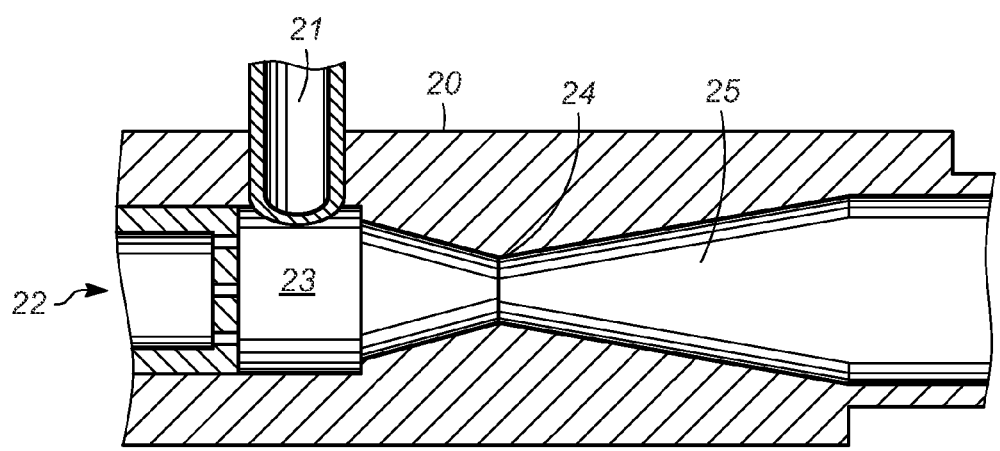
FIG. 2 illustrates an embodiment of a liquid-jet ejector utilizable in the subject invention.

FIG. 2 illustrates an example of a liquid-jet ejector of the invention. The liquid-jet ejector 20 is connected to the receiver of a fractionation column, described previously, via primary fluid inlet 21 through which uncondensed vapor from the receiver is drawn. The jet vacuum is effected by injecting pressurized liquid through secondary fluid inlet 22, entraining the primary fluid in the vacuum chamber 23 through a restriction 24 into the diffuser 25. The secondary fluid may be water or components of the selective solvent such as sulfolane, and preferably is sent to a suitable location in the aromatics process such as a stripper for recovery of valuable components. The orientation of the jet ejector is not an essential aspect of the invention, as suggested by the vertical orientation discharging into a receptacle of FIG. 1. Some examples of vacuum-jet ejectors can be found in U.S. Pat. No. 6,017,195 and U.S. Pat. No. 7,328,591 B2, incorporated herein by reference.

Solvents suitable for use in the extraction or extractive distillation process of the present invention have solubility selectivity for aromatic hydrocarbons and are water-soluble, oxygen-containing organic compounds. In order to be effective in a system of solvent extraction or extractive distillation, the solvent component must have a boiling point substantially greater than that of water, added to the solvent composition for enhancing its selectivity, and, in general, must also have a boiling point substantially greater than the end boiling point of the hydrocarbon feedstock. The solvent composition generally has a density greater than that of the hydrocarbon feedstock and is, accordingly, introduced into the uppermost portion of the solvent extraction or extractive-distillation zone, thereafter flowing downwardly, countercurrent to the rising hydrocarbon feedstock.

Organic compounds suitable as the solvent component may be selected from the relatively large group of compounds characterized generally as organic compounds containing hetero atoms such as oxygen, sulfur or nitrogen, comprising without limitation particularly the aliphatic and cyclic alcohols, glycols, glycol ethers, and glycol esters, sulfoxides and aliphatic and cyclic amides. The mono- and polyalkylene glycols in which the alkylene group contains from about 2 to about 4 carbon atoms, such as ethylene glycol, diethylene glycol, triethylene glycol and tetraethylene glycol, propylene glycol, dipropylene glycol, and tripropylene glycol constitute a suitable class of organic solvents useful in admixture with water. Dimethyl sulfoxide, N-methyl formamide and N-methyl pyrollidone are other useful solvents for aromatics recovery.

A particularly preferred class of selected solvents are those commonly referred to as the sulfolane-type. Such solvents have a five-membered ring, one atom of which is sulfur, the other four being carbon and having two oxygen atoms bonded to the sulfur atom. The four carbon atoms may be linked with hydrogen or alkyl groups. Other solvents preferably included are the sulfolenes such as 2-sulfolene or 3-sulfolene.

The solvent generally contains a small amount of water dissolved therein to increase the selectivity of the solvent phase for aromatic hydrocarbons over non-aromatic hydrocarbons without substantially reducing the solubility of the solvent phase for the aromatic hydrocarbons. The presence of water in the solvent composition provides a relatively volatile material which is distilled from the rich solvent in a stripping column to vaporize the last traces of non-aromatic hydrocarbons by way of steam distillation. The solvent composition contains up to about 25.0% by weight of water, and preferably from about 0.3% to about 15.0% depending upon the particular solvent employed and the process conditions under which the various major vessels are operated. The inclusion of water in the solvent composition, while reducing the solubility of aromatic hydrocarbons in the solvent to a small extent, greatly decreases the solubility of raffinate components in the solvent and also reduces the solubility of solvent in the raffinate stream.

The above description and examples are intended to be illustrative of the invention without limiting its scope. The skilled routineer will readily understand how to extrapolate parameters of the disclosure to other embodiments of the invention. The invention is limited only by the claims set forth herein.

The invention claimed is:

1. An apparatus for controlling the pressure in the overhead receiver of a distillation column comprising:
    a receiver-vapor conduit in fluid communication with the receiver and with a vapor inlet of a liquid-jet ejector;
    a fluid-recycle conduit in fluid communication with a liquid-jet inlet of the ejector;
a receptacle in fluid communication with the outlet of the ejector, wherein the receptacle separates lighter fluids from heavier fluids wherein the heavier fluids comprise sulfolane; and
    an outlet conduit in fluid communication with the receptacle and an ejector pump;
    wherein the fluid-recycle conduit is in fluid communication with the ejector pump and the ejector, and further wherein the fluid-recycle conduit is configured and arranged to communicate the heavier fluids to the ejector pump and the ejector.

2. The apparatus according to claim 1, wherein the lighter fluids comprise benzene, toluene and/or $C_8$-aromatics.

3. An apparatus for controlling the pressure in the overhead receiver of a distillation column for recovering a substantially hydrocarbon-free, polar-hydrocarbon-selective solvent from a mixture of the selective solvent and polar hydrocarbons comprising:
    a receiver-vapor conduit in fluid communication with the receiver and with a vapor inlet of a liquid-jet ejector;
    a fluid-recycle conduit in fluid communication with a liquid-jet inlet of the ejector;
    a receptacle in fluid communication with the outlet of the ejector, wherein the receptacle separates lighter fluids from heavier fluids; and
    an outlet conduit in fluid communication with the receptacle and an ejector pump;
    wherein the fluid-recycle conduit is in fluid communication with the ejector pump and the ejector, and further wherein the fluid-recycle conduit is configured and arranged to communicate the heavier fluids to the ejector pump and the ejector and further wherein the heavier fluids comprise sulfolane.

4. The apparatus according to claim 3, wherein the lighter fluids comprise benzene, toluene and/or $C_8$-aromatics.

* * * * *